(12) United States Patent
Roberge et al.

(10) Patent No.: US 9,475,598 B2
(45) Date of Patent: Oct. 25, 2016

(54) WRAPPING SYSTEM AND METHOD FOR LARGE COTTON OR BIOMASS BALES

(75) Inventors: Martin J. Roberge, Saskatoon (CA); Kevin S. Richman, Plainfield, IL (US); Jesse H. Orsborn, Warsaw, MO (US)

(73) Assignee: CNH Industrial America LLC, New Holland, PA (US)

( * ) Notice: Subject to any disclaimer, the term of this patent is extended or adjusted under 35 U.S.C. 154(b) by 658 days.

(21) Appl. No.: 13/818,011

(22) PCT Filed: Aug. 24, 2011

(86) PCT No.: PCT/US2011/049014
§ 371 (c)(1),
(2), (4) Date: Feb. 20, 2013

(87) PCT Pub. No.: WO2012/027504
PCT Pub. Date: Mar. 1, 2012

(65) Prior Publication Data
US 2013/0145724 A1  Jun. 13, 2013

Related U.S. Application Data

(60) Provisional application No. 61/402,124, filed on Aug. 24, 2010.

(51) Int. Cl.
| | |
|---|---|
| *B65B 11/00* | (2006.01) |
| *A01F 15/08* | (2006.01) |
| *B30B 9/30* | (2006.01) |
| *A01F 15/02* | (2006.01) |
| *A01F 15/07* | (2006.01) |

(52) U.S. Cl.
CPC ............ *B65B 11/00* (2013.01); *A01F 15/02* (2013.01); *A01F 15/071* (2013.01); *A01F 15/08* (2013.01); *A01F 15/0875* (2013.01); *B30B 9/3003* (2013.01); *A01F 2015/0745* (2013.01)

(58) Field of Classification Search
None
See application file for complete search history.

(56) References Cited

U.S. PATENT DOCUMENTS

| | | | | |
|---|---|---|---|---|
| 2,292,231 | A | * 8/1942 | Lesavoy | B65B 9/13 101/41 |
| 2,741,885 | A | 4/1956 | Allison | |
| 3,940,906 | A | * 3/1976 | Leckband | B65B 57/14 53/452 |
| 4,044,529 | A | 8/1977 | Zelnick | |
| 4,074,623 | A | * 2/1978 | White | A01F 15/145 100/19 R |
| 5,104,714 | A | * 4/1992 | Leiber | D01D 5/426 206/442 |
| 5,367,857 | A | 11/1994 | Carlson | |
| 5,479,766 | A | * 1/1996 | Ransom | A01D 85/004 100/3 |
| 5,704,283 | A | 1/1998 | Wiedel | |
| 5,752,374 | A | * 5/1998 | Allworden | A01F 15/04 100/100 |
| 5,855,107 | A | * 1/1999 | Haffield | B65B 9/15 53/548 |

(Continued)

FOREIGN PATENT DOCUMENTS

| | | |
|---|---|---|
| EP | 0048383 | 3/1982 |
| FR | 2735947 | 6/1995 |

*Primary Examiner* — Hemant M Desai
*Assistant Examiner* — Mobeen Ahmed
(74) *Attorney, Agent, or Firm* — Rebecca L. Henkel

(57) ABSTRACT

A system and method for wrapping bales of agricultural material including, but not limited to, cotton bales and biomass bales, provides a supply of tubular wrapping material at an outlet end of bale forming apparatus, for receiving successive large bales, and gathers, clamps, and cuts the wrapping material at a point between a just wrapped bale and the discharge opening, for closing the end of the wrapper of the just finished bale, and forming the wrapper for the next bale.

13 Claims, 18 Drawing Sheets

(56) References Cited

U.S. PATENT DOCUMENTS

| | | |
|---|---|---|
| 6,026,957 A | 2/2000 | Bauer et al. |
| 6,085,487 A | 7/2000 | De Vlaam |
| 6,658,819 B2 * | 12/2003 | Gamberini .............. B65B 11/10 53/436 |
| 7,007,596 B2 * | 3/2006 | Telscher .................. B65B 27/12 100/29 |
| 2002/0124529 A1 * | 9/2002 | van der Lely ........ A01F 15/071 53/411 |
| 2004/0121108 A1 * | 6/2004 | Mass ...................... A01F 15/071 428/57 |
| 2006/0053750 A1 * | 3/2006 | Petersen ................... B65B 9/14 53/441 |
| 2006/0101624 A1 * | 5/2006 | Derscheid ........... A01F 15/0715 24/306 |
| 2006/0219104 A1 * | 10/2006 | Covington ........... A01D 46/084 100/220 |
| 2008/0134645 A1 * | 6/2008 | Mass ................... A01F 15/0715 53/462 |

* cited by examiner

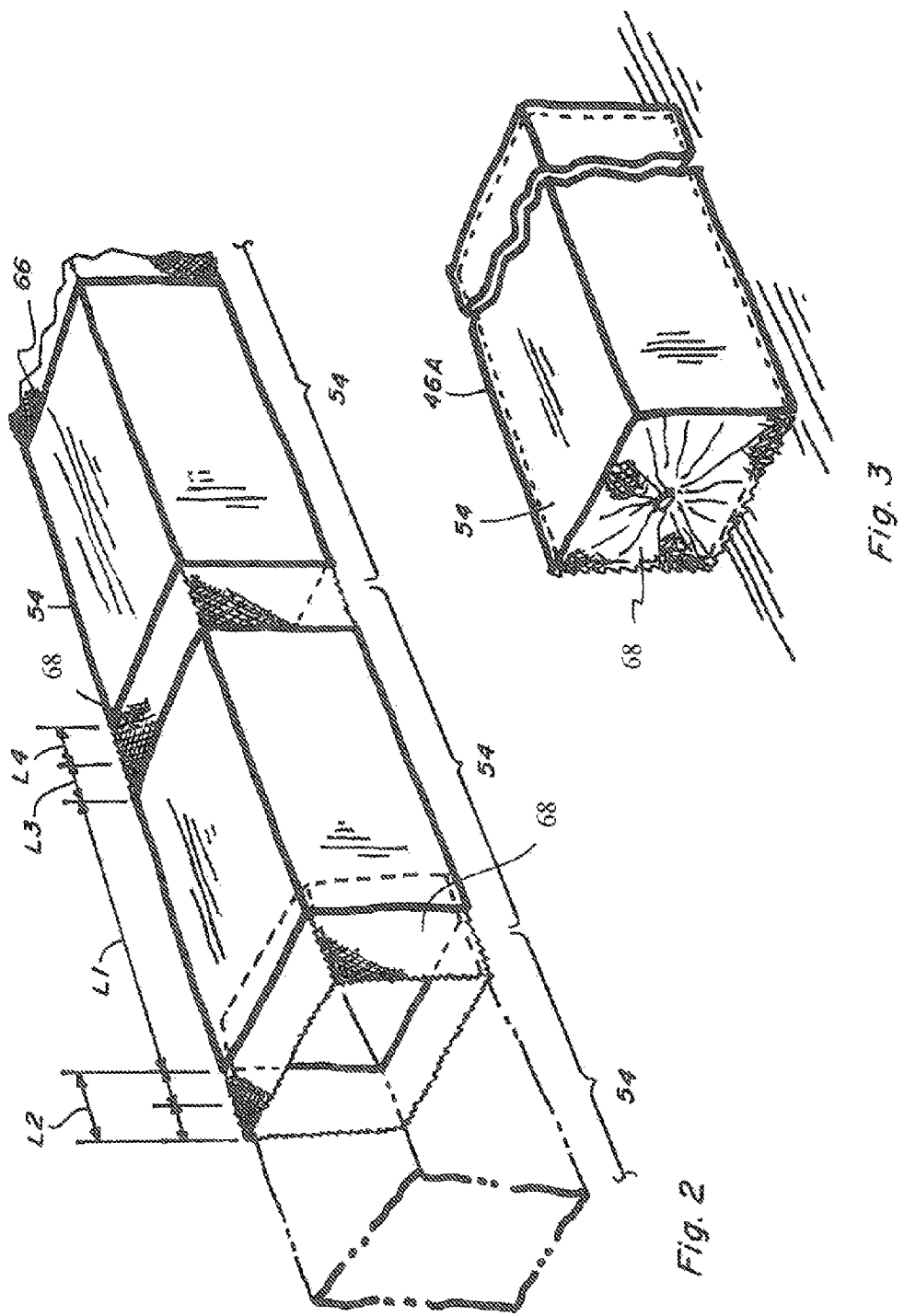

WRAPPING SYSTEM AND METHOD FOR LARGE COTTON OR BIOMASS BALES

This application claims the benefit of U.S. Provisional Application No. 61/402,124, filed Aug. 24, 2010.

TECHNICAL FIELD

This invention relates generally to a system and method for wrapping bales of agricultural material including, but not limited to, cotton bales and biomass bales, and more particularly, which provides a supply of tubular wrapping material at an outlet end of the bale forming apparatus, adapted for receiving successive large bales produced by the bale forming apparatus, and which gathers, clamps, and cuts the wrapping material at a point between a just wrapped bale and the discharge opening, for closing the end of the wrapper of the just finished bale, and forming the wrapper for the next bale.

BACKGROUND ART

The disclosure of U.S. Provisional Application No. 61/402,124, filed Aug. 24, 2010, is hereby incorporated herein in its entirety by reference.

Large unitary bales of agricultural material, e.g., cotton, biomass, hayage, silage, etc., also commonly referred to as modules, or large square bales, are a common manner of packaging for high productivity. Presently, large baling and packaging apparatus carried on or towed by harvesting machines, also referred to as module builders or on-board module builders (OBMB), are capable of forming bales and modules as large as 8 feet by 8 feet by 16 feet (approx. 250 by 250 by 500 cm). These bales and modules are unloaded to ground level without covers or other wrapping materials. This unloading can occur in the field, or at the periphery of the field, and the bales or modules are picked up later for processing, use, or storage. Tarps designed to cover the top and partially the sides of the bales or modules are often installed within a few hours after unloading. Such bales or modules would benefit, however, by being wrapped or packaged as they are unloaded, for instance, when the OBMB tilts to unload the bale or module onto a field. An advantage would be that the integrity of the module would be improved and ground losses of the agricultural material would be reduced.

Therefore, what is sought is a system and method for wrapping large bales and modules of agricultural material including, but not limited to, cotton bales and biomass bales, before being unloaded onto the ground, so as to improve integrity and reduce ground losses.

SUMMARY OF THE INVENTION

What is disclosed is a system and method for wrapping large bales and modules of agricultural material including, but not limited to, cotton bales and biomass bales, before being unloaded onto the ground, so as to improve integrity and reduce ground losses. The term "biomass" should be interpreted broadly to include that and other balable plant materials.

According to a preferred aspect of the invention, the system and method are utilized on or in association with a mobile bale forming apparatus, having a floor for carrying compacted bales from a bale forming chamber of the apparatus. The system of the invention includes wrap dispensing structure disposed about a path along the floor and defining an opening through which the bales will successively pass when leaving the bale forming chamber. The wrap dispensing structure holds and contains an elongate tube of wrapping material having cross sectional dimensions for fitting about the bales and a longitudinal dimension sufficient for receiving at least two of the bales in succession. The wrap dispensing structure is configured and operable for holding an open end of the tube of the wrapping material about the opening such that as each of the bales pass through the opening the bales will enter the tube and progressively pull the wrapping material from the wrap dispensing structure about the bale so as to be progressively covered by the wrapping material and so as to be at least substantially fully covered by the wrapping material when exiting the opening.

According to another preferred aspect of the invention, the system includes wrapper closing apparatus disposed adjacent to the wrap dispensing structure, configured and operable for gathering the tube of the wrapping material between the wrap dispensing structure and the wrapped bale, cinching the material about an end of the bale to close the tube, and placing a clamp about the cinched material for holding the tube closed about the end of the bale.

According to another preferred aspect of the invention, the wrapper closing apparatus is configured and operable for severing the clamp and the clamped wrapping material for enclosing an end of a wrapper of the tube of the wrapping material for a next successive one of the bales.

According to another preferred aspect of the invention, the wrapper closing apparatus comprises a jaw configured and operable for closing about the wrapping material in a generally circular manner for cinching the wrapping material about the end of the bale and simultaneously tightly clamping the clamp about the cinched wrapping material. The jaw preferably carries an elongate arm that will circumscribe a generally circular path about the tube of the wrapping material about a center region of the end of the bale, for gradually gathering the wrapping material toward the center region of the end of the bale. As another preferred aspect, the wrapper closing apparatus is configured and operable to be automatically movable between a first position adjacent to a path of movement of the bales from the opening of the wrap dispensing structure to allow unobstructed passage of the bales from the opening, and a second position in the path of movement. As a non-limiting example, the wrapper closing apparatus can comprise an arm pivotable between the first position and the second position. And, the arm can carry a dispenser containing a plurality of the clamps, configured and operable for dispensing the clamps in succession into the jaw.

As still another preferred aspect of the invention, the wrapping material can comprise, as a non-limiting example, commercially available plastics, or fabrics, and portions for covering the ends of the bales or other regions can be of an air permeable mesh material, such as a cotton.

BRIEF DESCRIPTION OF THE DRAWINGS

FIG. 2 is a fragmentary perspective view of one embodiment of tubular wrapping material for the system of the invention;

FIG. 3 is a fragmentary perspective view of a cotton module wrapped with the material of FIG. 2, showing a clamp cinching one end of the wrapper;

DETAILED DESCRIPTION OF THE INVENTION

Figure 1:
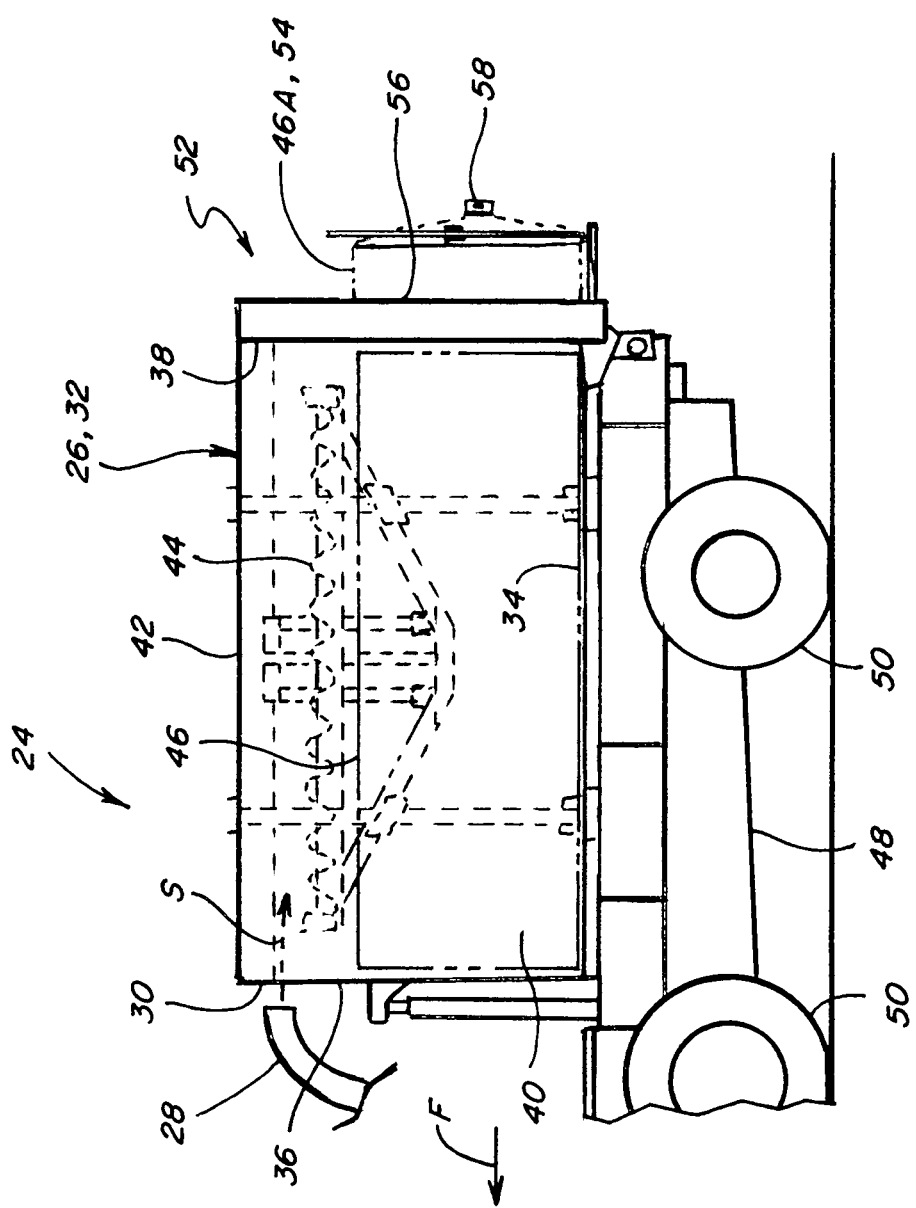
FIG. 1 is a simplified fragmentary side view of on-board bale forming apparatus comprising a cotton module builder, on a cotton harvester, and including a bale wrapping system of the invention, shown in an initial phase of wrapping a cotton module as it is discharged from the module builder.

Referring now to the drawings, FIG. 1 depicts a self-propelled cotton harvester 24 including an on-board bale forming apparatus 26 constructed and operable according to the invention for collecting and compacting the cotton into uniformly compacted unitary bales, and discharging or unloading the bales onto the ground or another surface, or another vehicle such as a self-propelled bale handler, trailer, accumulator, wagon, truck, or the like, as harvester 24 moves in a forward direction F over a field. Harvester 24 here is configured to include apparatus on a forward end thereof, of conventional construction and operation for picking and propelling an airborne stream of cotton upwardly and rearwardly through ducts 28 into a compacting chamber 30 of apparatus 26, as denoted by arrows S. It should be noted that the invention is contemplated for use with harvesters and other machinery for harvesting and/or picking up any of a wide variety of plant material and biomass, and therefore is not limited to cotton.

Compacting chamber 30 is part of a bale forming structure 32 of apparatus 26, and is defined on the bottom by a floor 34; at the forward end by an upstanding forward wall 36; at the rear end by an upstanding rear door (not shown) enclosing an unloading opening 38; on the opposite sides by upstanding side walls 40; and on top by a roof 42. Bale forming apparatus 26 includes compacting apparatus 44 which can be of conventional, well-known construction, disposed in an upper region of chamber 30 and movable upwardly and downwardly therein, for compacting the cotton against floor 34 for forming a unitary compacted module or bale 46 in chamber 30, which will be unloaded through opening 38, all in the well-known manner. Bale forming structure is supported on a frame 48 of harvester 24, which also carries an operator cabin, an engine and a drivetrain (not shown) connected in driving relation to wheels 50 that support harvester 24 for movement over the ground and other surfaces, also all in the well-known manner. As representative, but non-limiting values, a bale 46 produced by bale forming apparatus 26 will have a length of about 16 feet, a width of about 8 feet and a height also of about 8 feet, or 500×250×250 cm.

Figure 1A:
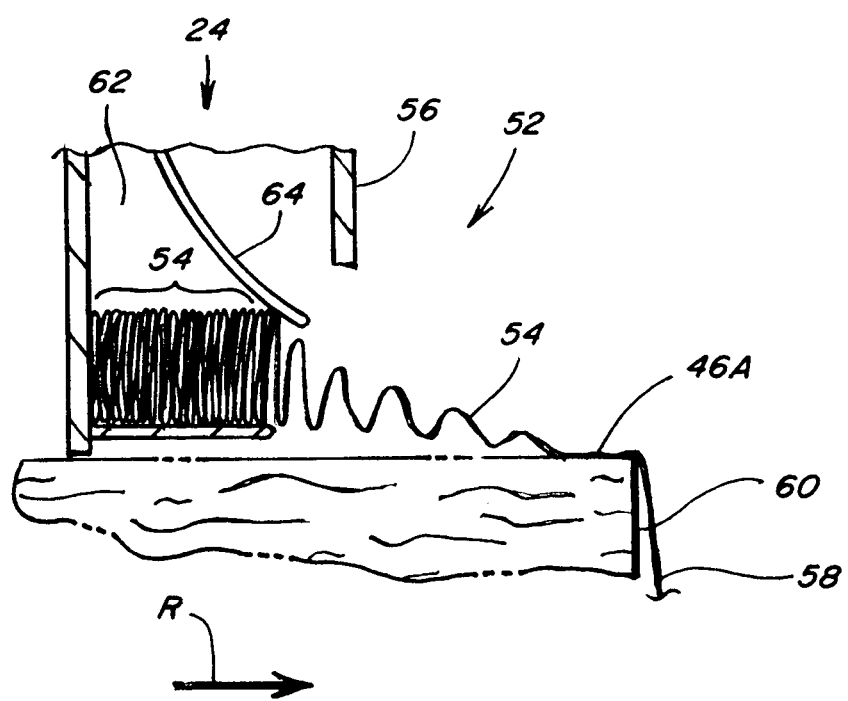
FIG. 1A is an enlarged fragmentary side view in partial section, of an aspect of a wrap dispensing structure of the system of the invention, shown dispensing wrapping material over a bale exiting the apparatus.
Figure 1B:
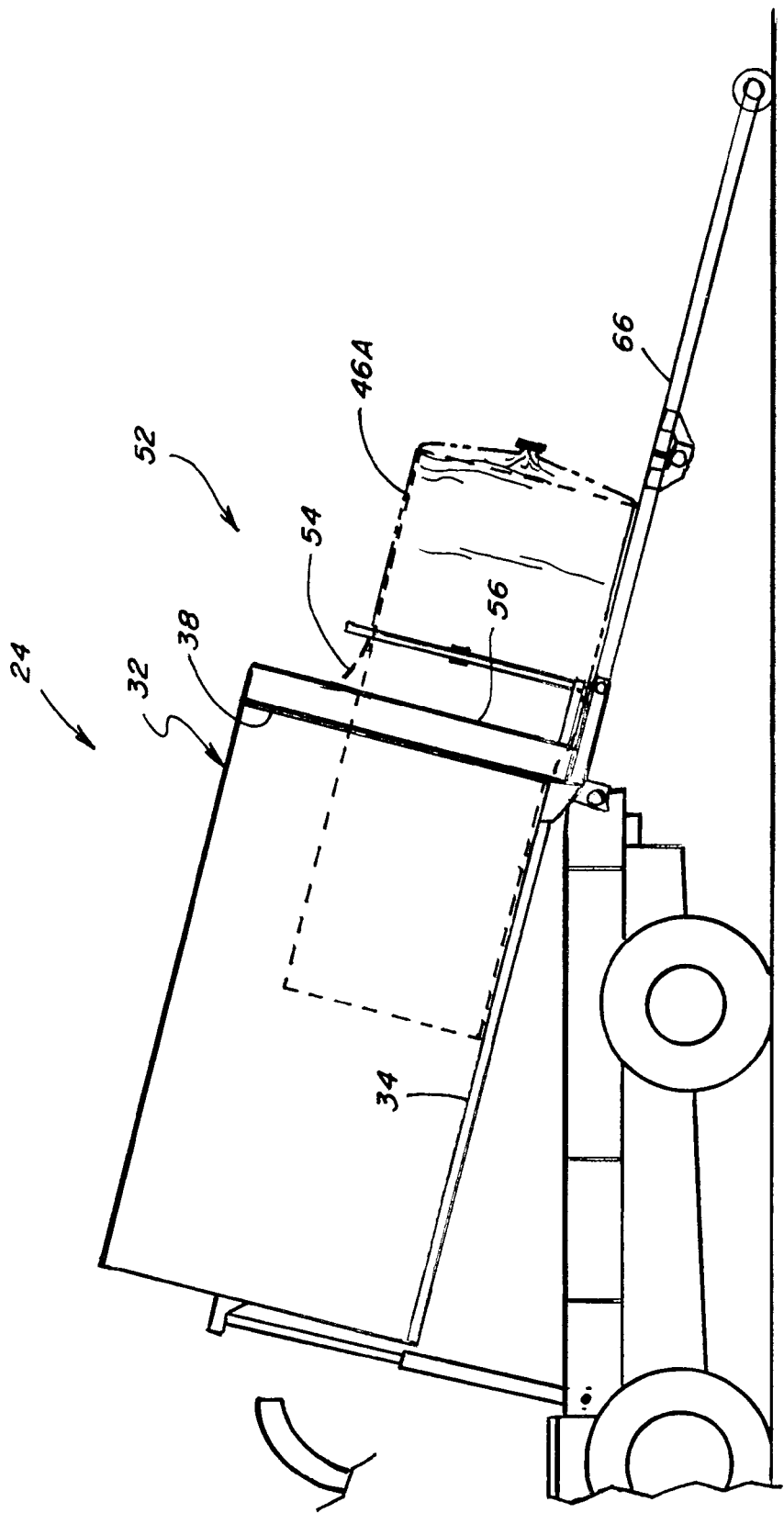
FIG. 1B is another simplified fragmentary side view of the on-board bale forming apparatus, bale wrapping system of FIG. 1, tilted on the harvester for wrapping and unloading the bale onto a surface below the harvester.

Referring also to FIGS. 1A, 1B, 2, 3, 4 and 5, harvester 24 includes a bale wrapping system 52 constructed and operable according to the teachings of the invention for wrapping a bale with a wrapper 54 as the bale is discharged or unloaded through unloading opening 38 of bale forming structure 32, as denoted by partially wrapped bale 46A. As illustrated in FIGS. 1, 1A and 1B, wrapper 54 will be contained in a wrap dispensing structure 56 located rearwardly of the rear door of structure 32 and preferably comprising a rectangular box extending about and defining an opening extending about a path along which bales 46 will travel as they are discharged from bale forming apparatus 26.

A wrap 54 being dispensed will have an enclosed rear end 58, such that as a bale 46A is discharged, a rear end 60 of bale 46A will enter rear end 58 of wrap 54 and gradually pull it rearwardly from wrap dispensing structure 56 and about the bale. To facilitate this, wrap dispensing structure 56 is located just rearwardly of unloading opening 38 of bale forming structure 32, and forms a rectangular cavity 62 extending about the unloading path, and wraps 54 are each of a rectangular shaped tubular construction, such that a bottom section of the wraps will be contained in a bottom portion of cavity 62 below the path, sides of the wraps will be located in side portions of cavity 62 beside opposite sides of the path, and upper sections of the wraps will be located in an upper portion of the cavity (FIG. 1A).

Preferably a plurality of wraps 54 will be contained in wrap dispensing structure 56 for dispensing in succession about a succession of bales, and to facilitate this, structure 56 is configured to be large enough to carry at least several wraps 54. Also to facilitate this, wraps 54 are preferably configured to be compressible, here, folded in succession in the manner of an accordion or bellows, so as to be dispensed as pulled rearwardly by a bale 46, as denoted by arrow R in FIG. 1A. Wraps 54 can be suitably retained until pulled out by a bale, using a detent element 64, comprising a biasing element or elements, e.g., a leaf spring or springs, or the like. Structure 56 can also include apparatus around the passage, such as one or more actuators along the inner periphery of cavity 62, that will expand or stretch wraps 54 sidewardly and/or vertically, for better receiving a bale. Smooth surfaces at the locations of contact with the wraps can be used to prevent tearing or other damage as the wraps are dispensed.

In FIG. 1B, harvester 24 is illustrated as including a folding unloading door 66 constructed and operable in the well known manner, rearwardly of wrap dispensing structure 56. Door 66 when unfolded as shown is operable in cooperation with tilting of bale forming structure 32, for unloading bales such as bale 46A, onto the ground or another surface, and wrap dispensing structure 56 is configured and operable for automatically dispensing a wrapper 54 about a bale 46A as it moves rearwardly over door 66. To facilitate the rearward movement, door 66 can include moving chains, belts and/or a low friction upper surface.

As illustrated in FIGS. 2 and 3, it is desired that several of the wrappers 54 be carried by wrap dispensing structure 56, so as to be capable of wrapping a corresponding number of bales automatically, without reloading or replenishing the wrappers. To facilitate this, multiple wraps 54 are joined together in end to end continuous tubular relation. Additionally, for some applications, it may be desired to have some portion of the wraps 54 be air permeable, and this can be achieved by providing portions 68 of an air permeable net or mesh material, preferably of cotton or other natural fiber, while other portions are of a solid sheet material such as a fabric of a natural fabric such as cotton, or a film material such as a synthetic plastics material such as a polyethylene. Here, the tubular wrappers 54 are configured such that mesh portions 68 will form the ends of wrappers 54 to be gathered and cinched about ends of the bales 46A according to the invention, as described next. The solid sheet material portions of wrappers 54 will each have a length L1 which will correspond to the length of a bale 46A, and mesh portions 68 will have lengths L2 of lengths L3 and L4 sufficient to stretch about and cover the ends of a bale when the wrapper 54 is cinched thereabout, as illustrated in FIG. 3.

Figure 4:
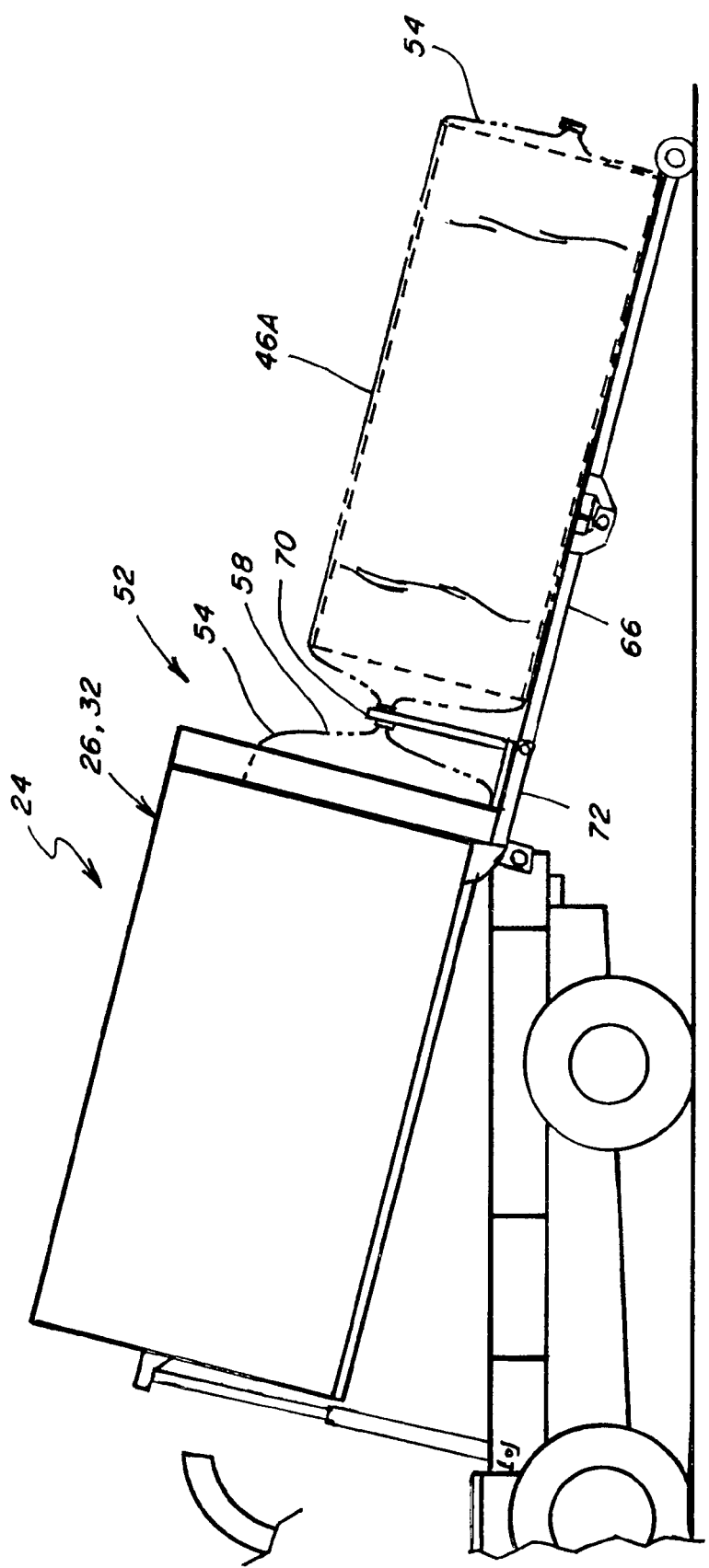
FIG. 4 is another simplified fragmentary side view of the module builder of FIG. 1 tilted in the unloading position, showing the system of the invention cinching and clamping the wrapping material between a just finished bale and a wrapper for a next successive bale.
Figure 5:
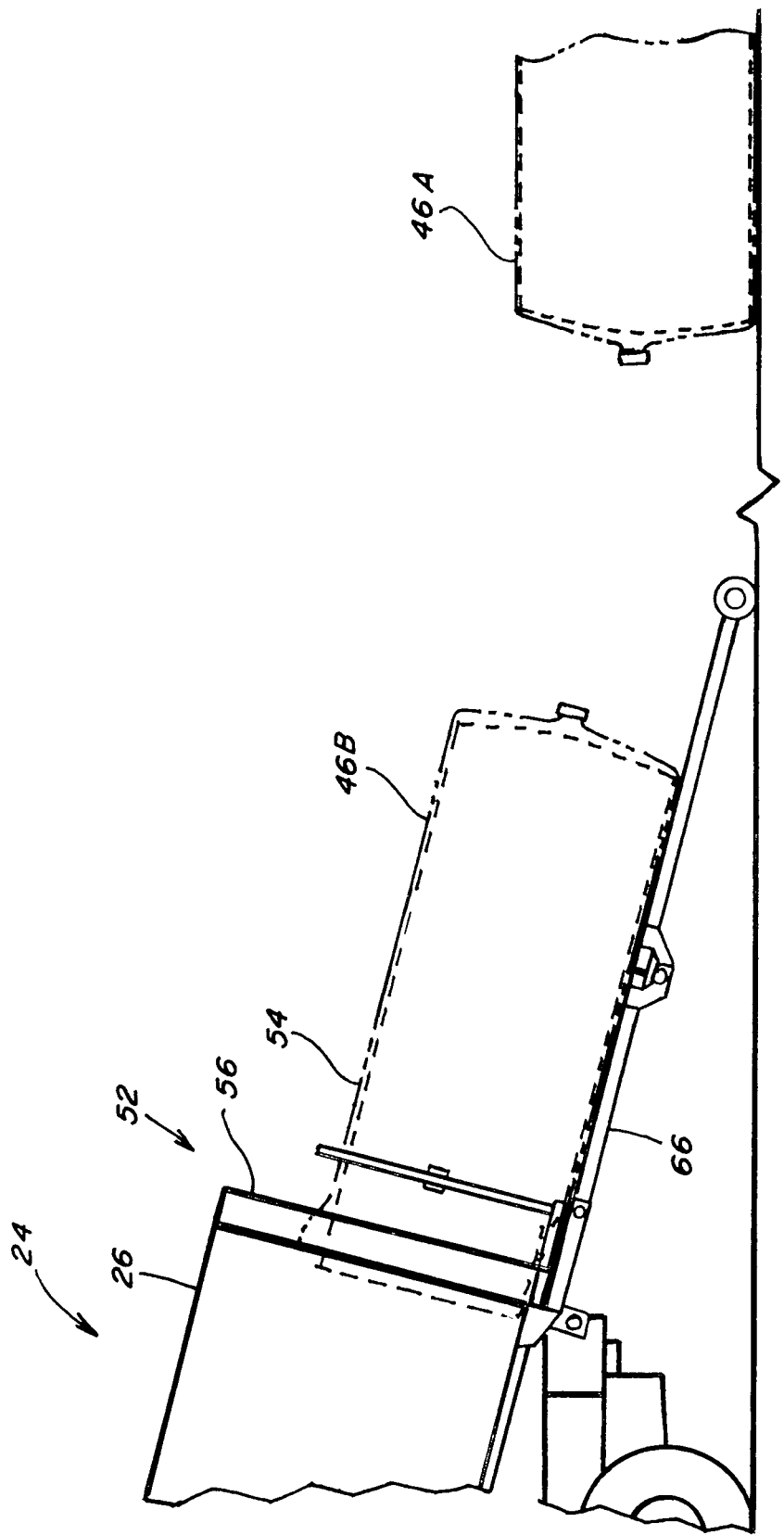
FIG. 5 is another simplified fragmentary side view of the module builder of FIG. 1 tilted in the unloading position, showing the system of the invention, a bale being unloaded, and an unloaded bale on the ground.

In FIG. 4 a bale 46A is shown on unloading door 66, completely unloaded from bale forming apparatus 26, but not yet unloaded onto the ground. Once the bale is clear of apparatus 26, the rear door of that apparatus can be closed so that apparatus can resume operation for forming the next bale. At this time, before unloading onto the ground, it is desired to close the end of wrap 54 facing harvester 24, and to also prepare the next wrapper 54 for receiving the next bale to be formed. This is accomplished using wrap closing apparatus 70 of the invention. Wrap closing apparatus 70 is disposed just rearwardly of wrap dispensing structure 56 on a platform 72 which is an extension of floor 34 to unloading door 66, such that bales 46A will travel over platform 72 between floor 34 and the door. Floor 34 and/or door 66 can include elements for unloading and controlling movements of the bales, such as drag chains, belts, or the like. Wrap closing apparatus 70 is configured and operable for gathering the tube of wrapping material at the forward end of a partially wrapped bale 46A on door 66, cinching the gathered material closely adjacent to the end of the bale, and placing a band or clamp thereabout, for closing the wrapping material about the end of the bale. The finished bale is now ready to be completely unloaded from harvester 24. At the same time that the clamp is clamped about the cinched material, or just after, the clamp is cut to form two clamps, the second one cinching and clamping a rear end 58 of another wrapper 54, so as to be ready for receiving the next bale, denoted 46B in FIG. 5. To facilitate this, the clamping and cutting is performed close to the end of bale forming apparatus 26, so that only a limited amount of free wrapper will be dispensed. Bale 46B will be unloaded from bale forming apparatus 26 in the same manner as bale 46A, and will be received in the next wrapper 54 dispensed by wrap dispensing structure 56 of system 52 in the same manner.

Figure 6:
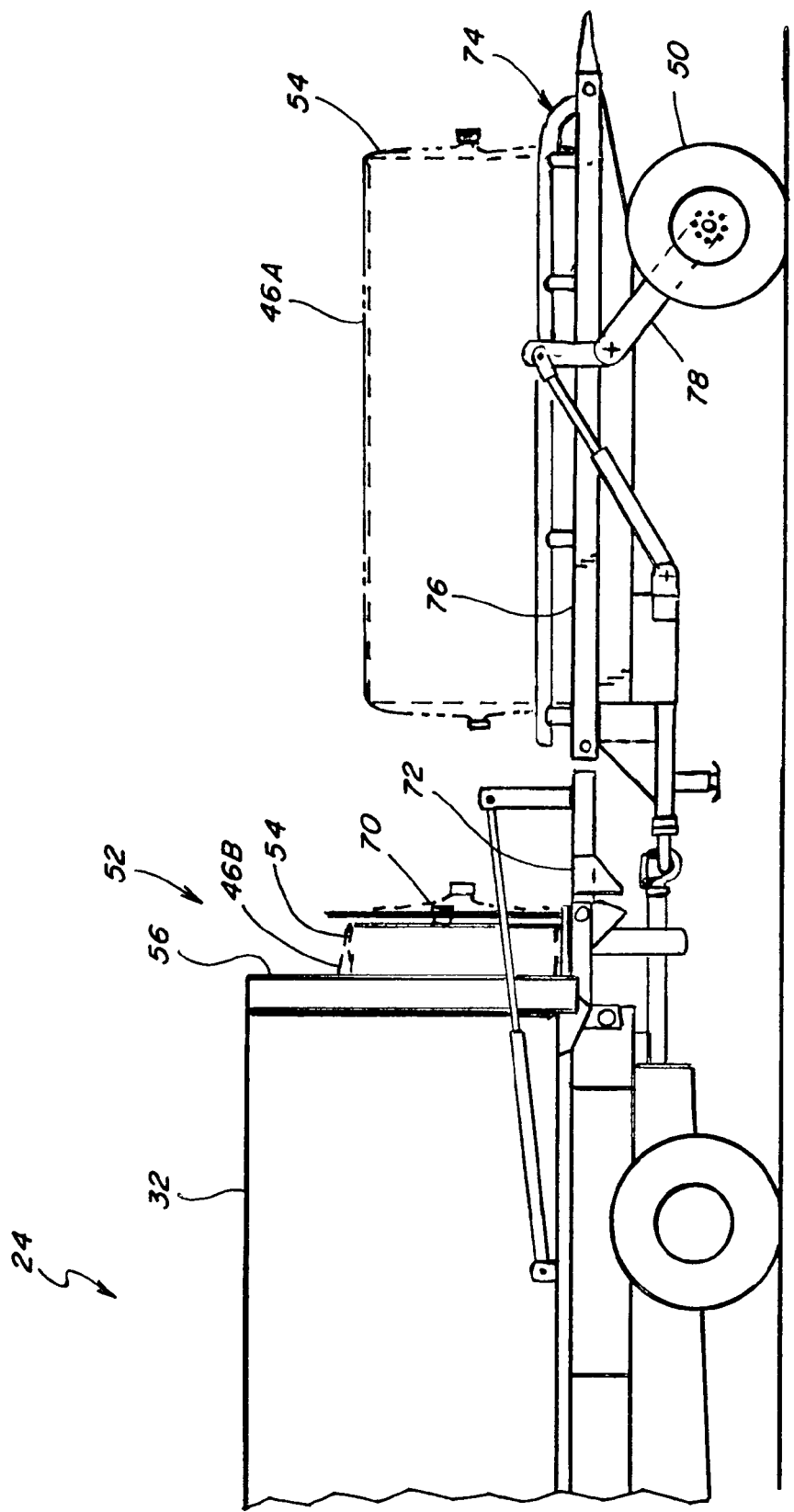
FIG. 6 is another simplified fragmentary side view of the module builder of FIG. 1, and a bale trailer or bale accumulator towed by the harvester behind the module builder, showing a bale being discharged by the builder, and another bale carried on the trailer.
Figure 7:
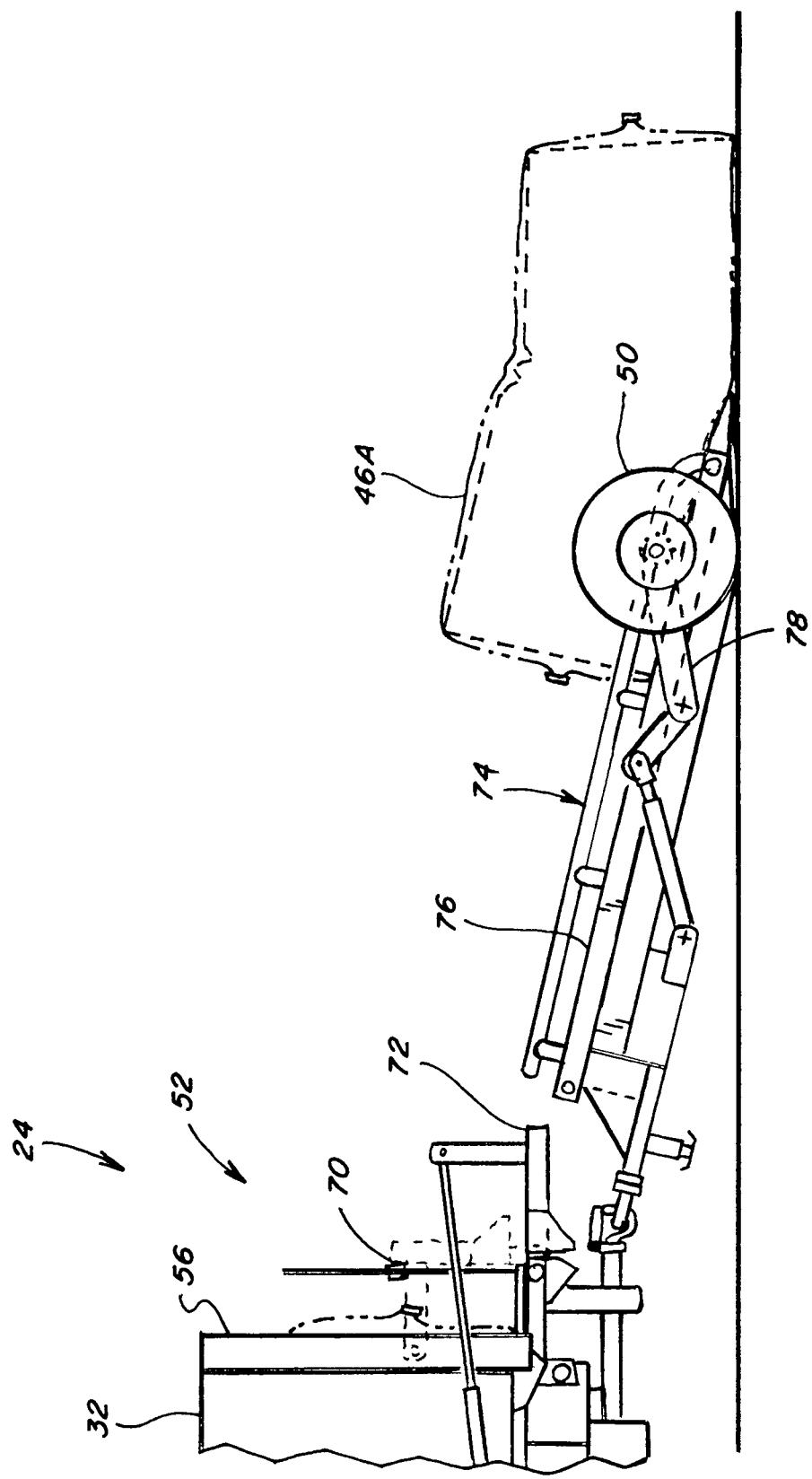
FIG. 7 is another simplified fragmentary side view of the module builder and trailer of FIG. 6, with the trailer tilted for unloading the bale therefrom.

Referring also to FIGS. 6 and 7, harvester 24 is shown towing a bale caddy 74 for receiving bales from bale forming structure 32. Caddy 74 is a trailer towed by harvester 24 just rearwardly of platform 72. Caddy 74 includes an upper surface 76 located rearwardly of platform 72 and alignable therewith when harvester 24 and caddy 74 are on a level surface, for smooth unloading of bales to the caddy. System 52 of the invention is operable in the above described manner, that is, a wrapper 54 will be dispensed by wrap dispensing structure 56 as the bale emerges from bale forming structure 32, and the end of that wrapper, as well as the end of the next wrapper, will be gathered, cinched, clamped, and cut, to close both wrappers and separate them. Use of caddy 74 allows saving time because bale forming structure 32 does not have to be tilted for unloading, and can continue operation as wrapper 54 is cinched, clamped and cut. When it is desired to unload a bale from caddy 74, it can be suitably tilted (FIG. 7), e.g., using a mechanism for that purpose, such as a fluid cylinder mechanism 78 operable in the manner shown for lowering the rear end of the caddy. Alternatively, either bale forming structure 32 or caddy 74 can be unloaded horizontally onto a truck or trailer.

Referring also to FIGS. 8 through 19, steps of operation of a preferred embodiment of wrap closing apparatus 70, are illustrated, to show one manner of gathering, cinching, clamping, and cutting the wrapping material of a wrapper 54 for enclosing the end thereof for receiving a typical bale, simultaneously with the closing of a wrapper about a finished bale. Essentially, apparatus 70 here comprises a rotary mechanism, including an element configured and operable for closing about the wrapping material in a generally circular manner to progressively gather the tubular wrapping material toward the center of the tube and cinch it, so as to close the wrapper 54 about the end of the finished bale, while simultaneously tightly clamping a clamp about the cinched wrapping material for holding it. At the same time, on the other side of the clamp the end of the next wrapper is closed, so as to be ready for receiving the next bale.

Figure 8:
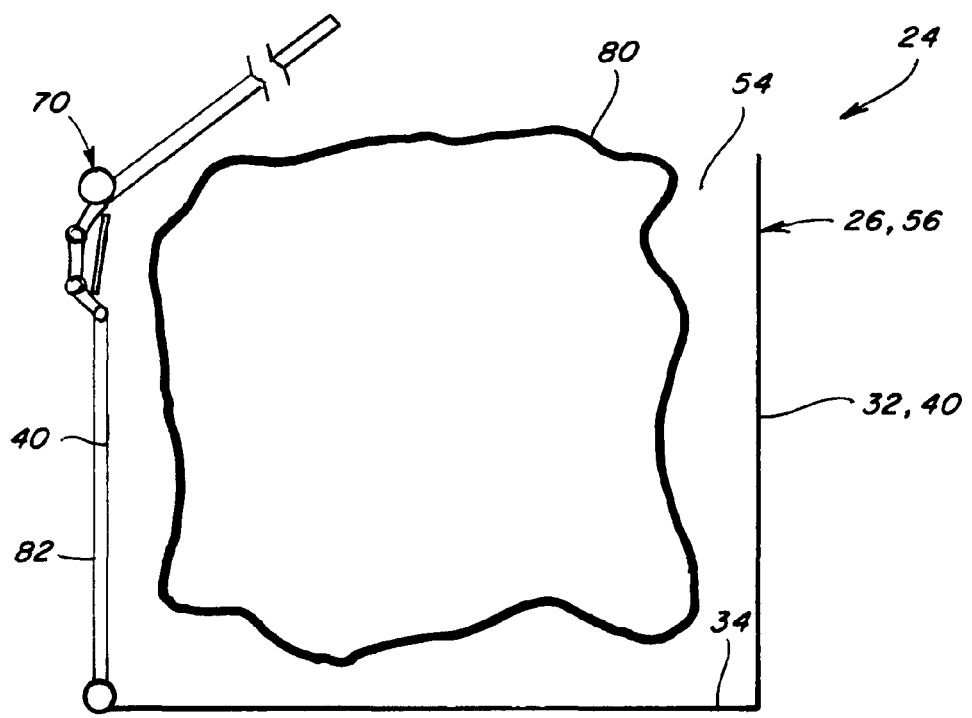
FIG. 8 is a simplified rear view of the module builder and apparatus of the system of the invention in a standby configuration, showing as a heavy dark line a sectional view of a representative wrapper between a finished bale and a discharge outlet of the module builder.

To illustrate, in FIG. 8, wrap closing apparatus 70 is shown in a standby position, generally parallel to one side wall 40 of bale forming structure 32 beside the path of travel of a bale from bale forming apparatus 26 and wrap dispensing structure 56. In this view, the observer is looking forward, and the tubular wrapping material is illustrated in section by a continuous edge 80 of the end of a wrap 54 being closed for receiving the next bale to pass from apparatus 26 and structure 56. It can be observed that edge 80 of wrapper 54 maintains a generally rectangular shape.

Figure 9:
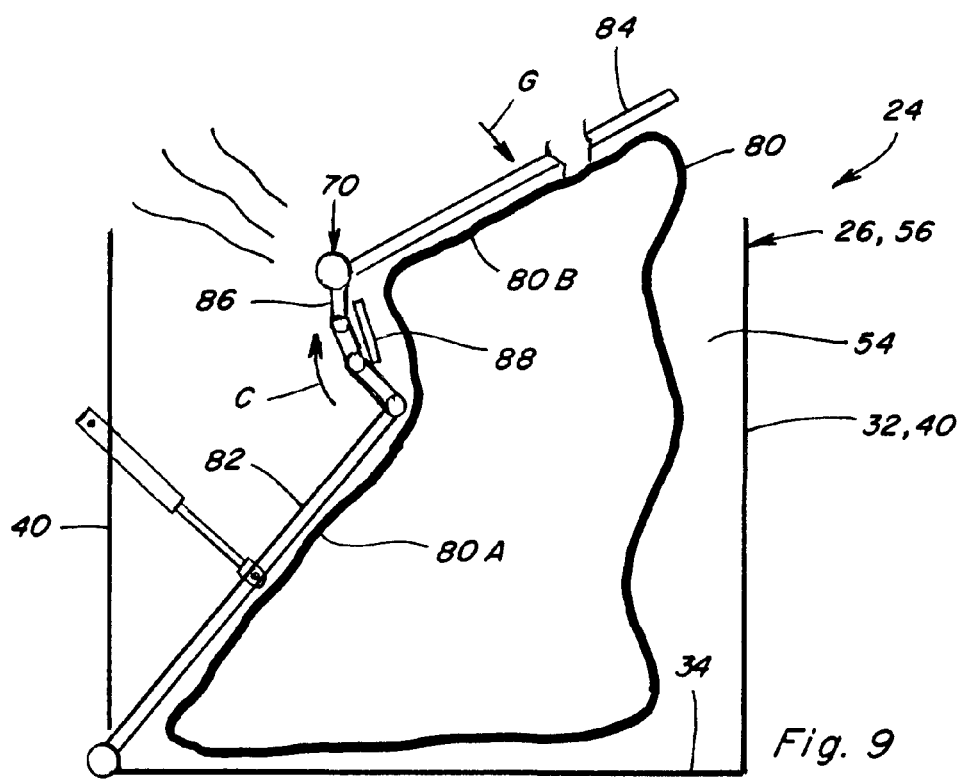
FIG. 9 is another simplified rear view of the module builder with the apparatus of the invention in a deployed configuration, initially contacting and gathering the wrapper.

In FIG. 9, apparatus 70 is shown moved to a deployed or operational position, engaging and pushing the adjacent side of wrapper 54 inward to the center thereof. This can be accomplished using any suitable mechanism, such as, but not limited to, a linear or rotary actuator, such as, but not limited to, the fluid cylinder shown. As this movement occurs edge portions 80A and 80B of the wrapper are flattened by apparatus 70. More particularly, portion 80A is flattened by an elongate support arm 82 of apparatus 70, and portion 80B is flattened against an elongate gathering arm 84 of the apparatus. These two components are joined together by a mechanical jaw 86 of apparatus 70 located on a distal end of support arm 82 and shown in an initial open state. Jaw 86 thus supports gathering arm 84 in cantilever relation. A clamp 88 is shown in an initial straight open state held in jaw 86. As a next step in operation, jaw 86 will be operated to gradually close in a clockwise circular manner denoted by arrow C, which will cause gathering arm 84 to sweep in a clockwise circular manner for gathering the wrapping material, as denoted by arrow G. This gathering action is designed to push the wrapping material toward jaw 86, so as to be closed in clamp 88, as the jaw closes.

Figure 10:
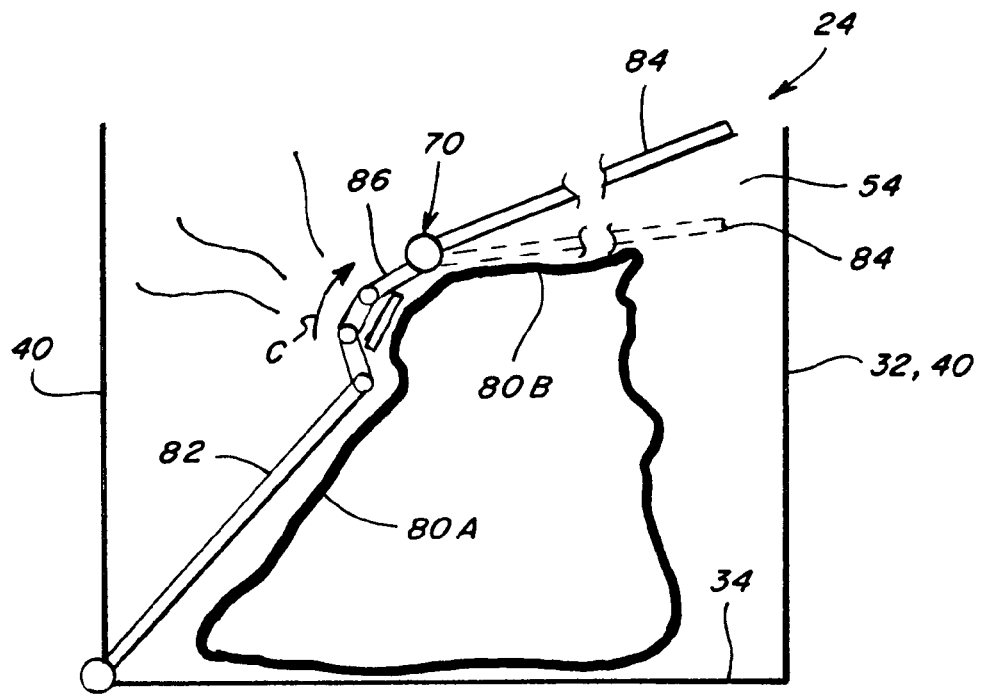
FIG. 10 is another simplified rear view of the module builder with the apparatus of the invention in the deployed configuration, further gathering the wrapper and partially forming a clamp about the gathered material of the wrapper.
Figure 11:
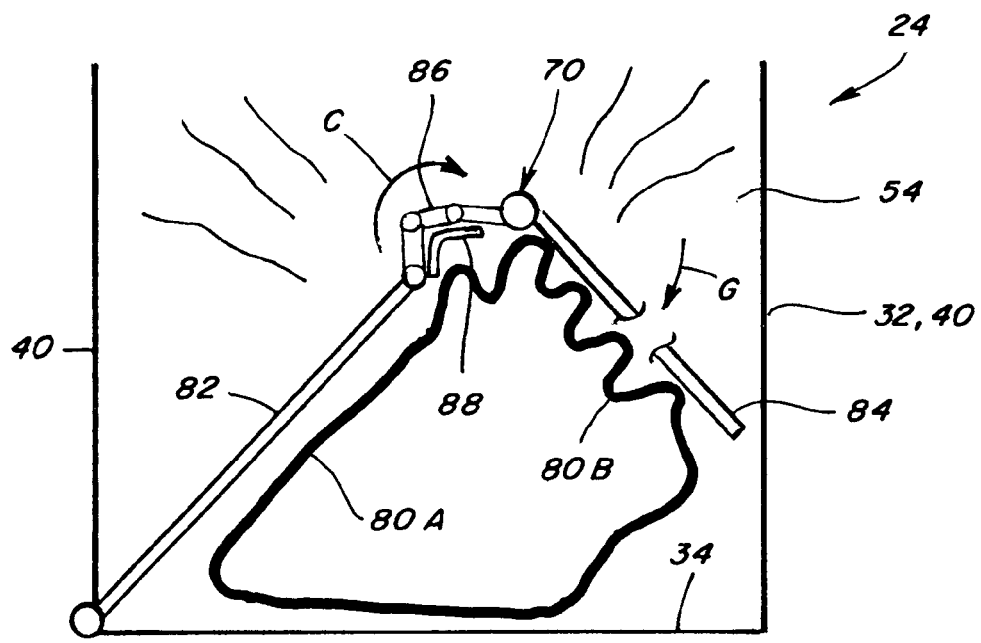
FIG. 11 is another simplified rear view of the module builder with the apparatus of the invention in the deployed configuration, further gathering the wrapper and forming the clamp thereabout.
Figure 12:
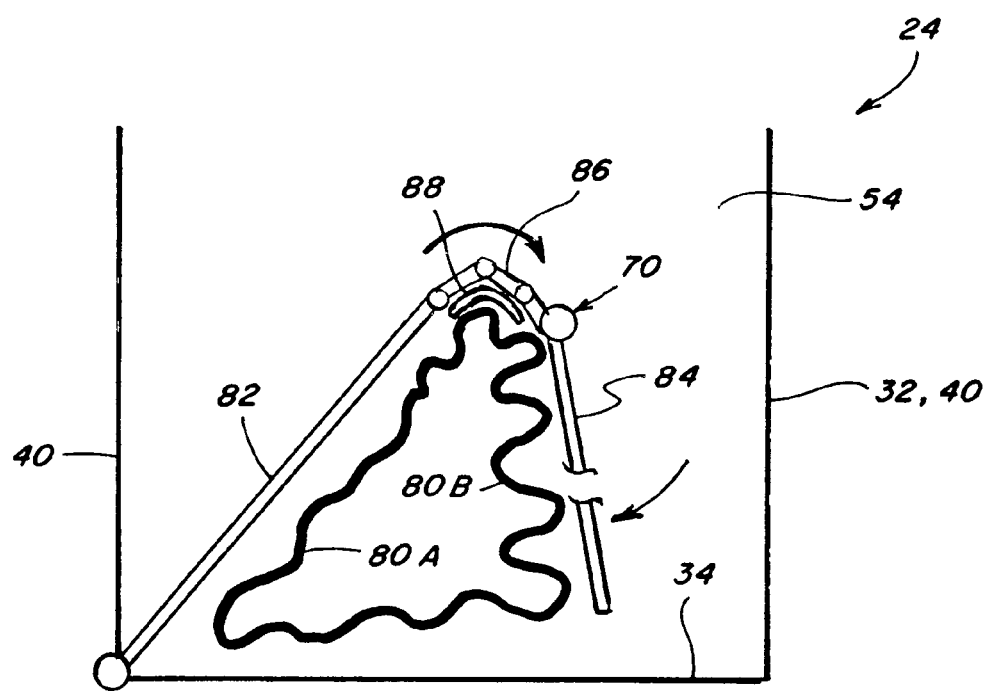
FIG. 12 is still another simplified rear view of the module builder and apparatus of the invention, further gathering the wrapper and forming the clamp thereabout.
Figure 13:
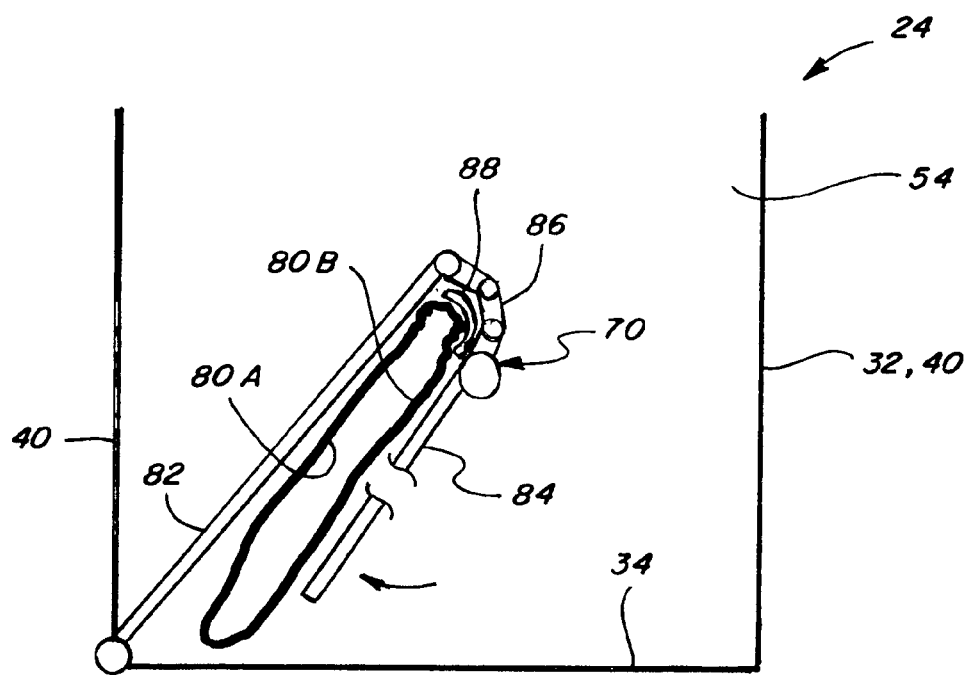
FIG. 13 is still another simplified rear view of the module builder and apparatus of the invention, further gathering the wrapper and forming the clamp thereabout.
Figure 14:
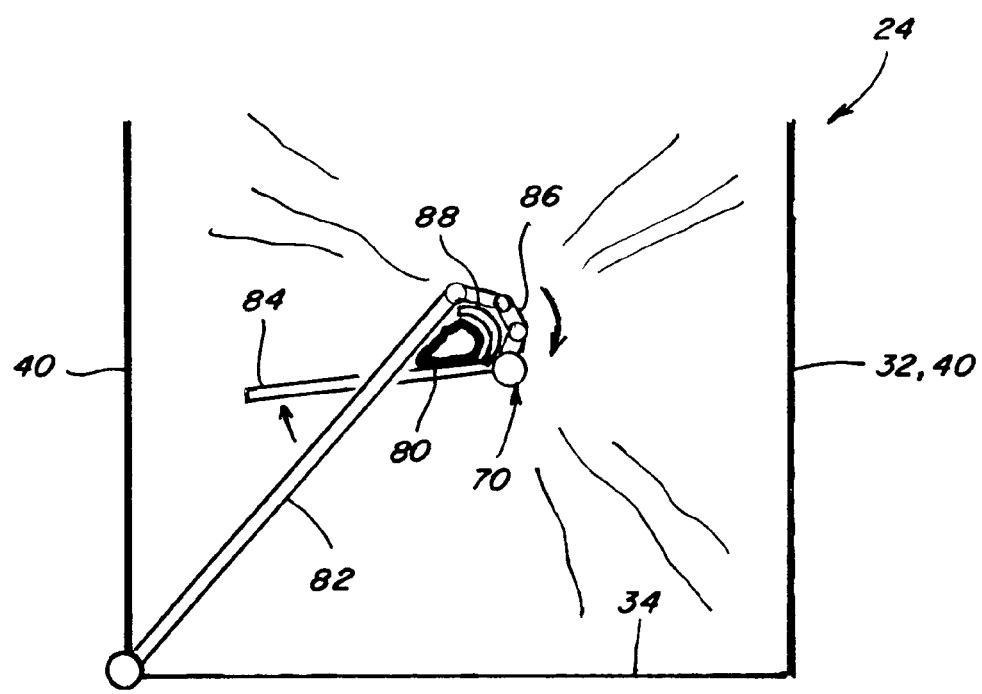
FIG. 14 is still another simplified rear view of the module builder and apparatus of the invention, further gathering and cinching the wrapper with the clamp thereabout.
Figure 15:
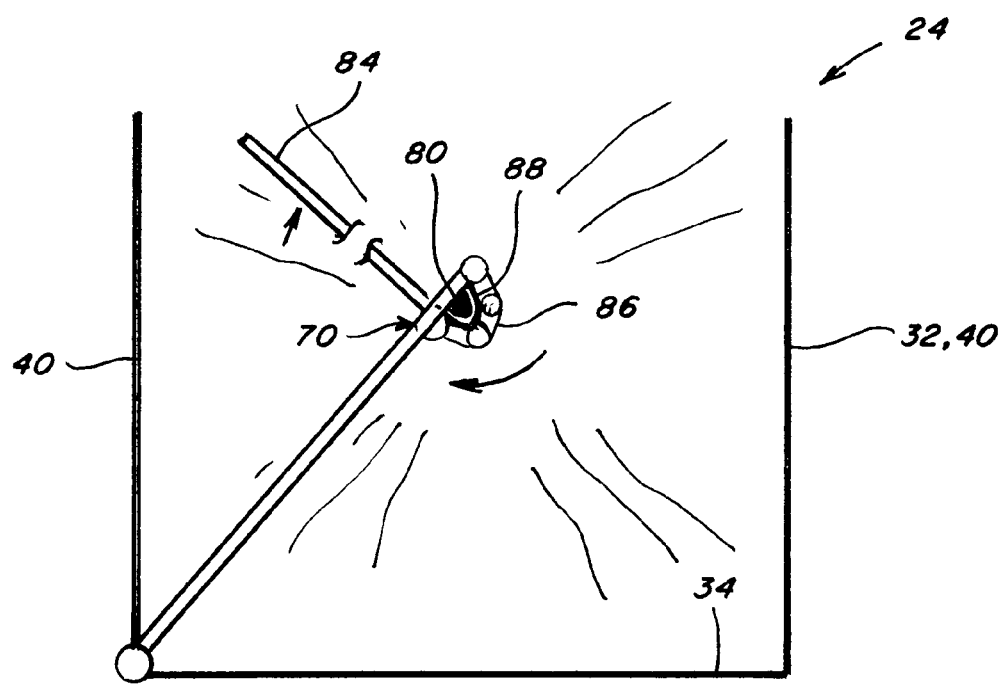
FIG. 15 is still another simplified rear view of the module builder and apparatus of the invention, further cinching the wrapper with the clamp.
Figure 16:
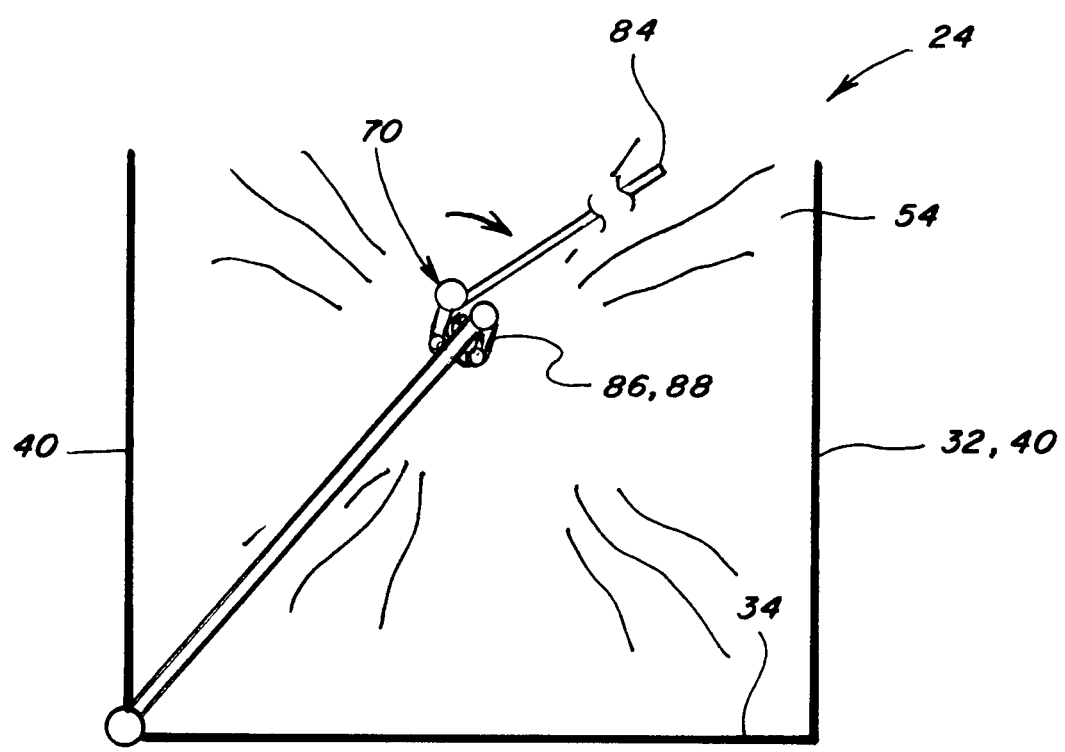
FIG. 16 is still another simplified rear view of the module builder and apparatus of the invention, finally cinching and clamping the wrapper.

In FIG. 10, gathering arm 84 (shown in dotted lines) is initially moved downwardly relative to support arm 82, by initial closing of jaw 86 denoted by arrow C. This pulls an upper region of the wrapping material downwardly, as denoted by the position of edge portion 80B. In FIG. 11, jaw 86 has closed further as denoted by arrow C, sweeping gathering arm 84 farther downwardly as denoted by arrow G. This brings edge portion 80B downwardly more toward edge portion 80A. Clamp 88 is also beginning to form into more of an open C shape. Turning to FIG. 12 arm 84 has moved clockwise further as jaw 86 has closed, further gathering the wrapping material as denoted by the relative positions and orientations of edge portions 80A and 80B. In FIG. 13, gathering arm 84 is brought nearly parallel with support arm 82 by the further closing of jaw 86, such that edge portion 80A of the wrapping material is brought nearly parallel with edge portion 80A, and clamp 88 is still open but has more of a C shape. In FIG. 14, and subsequent FIGURES, with further closing of jaw 86 gathering arm 84 has rotated further to cross behind support arm such that apparatus 70 now closes about the wrapping material and begins to cinch it, and drive it upwardly, as denoted by cinched edge portion 80, into clamp 88. Turning to FIG. 15, jaw 86 further cinches the material and closes clamp 88 a little more about the cinched material. In FIG. 16 the material is essentially completely received in clamp 88 and clamp 88 is now completely closed and gathering arm 84 is near its initial position. Also at this time, a rotary knife 90 disposed in connection with clamp 88 is used to cut clamp 88 and the material clamped thereby, in half, in the front to rear direction, to separate the finished wrapper disposed about a bale, e.g., see FIG. 3, and the next wrapper to be used.

Figure 17:
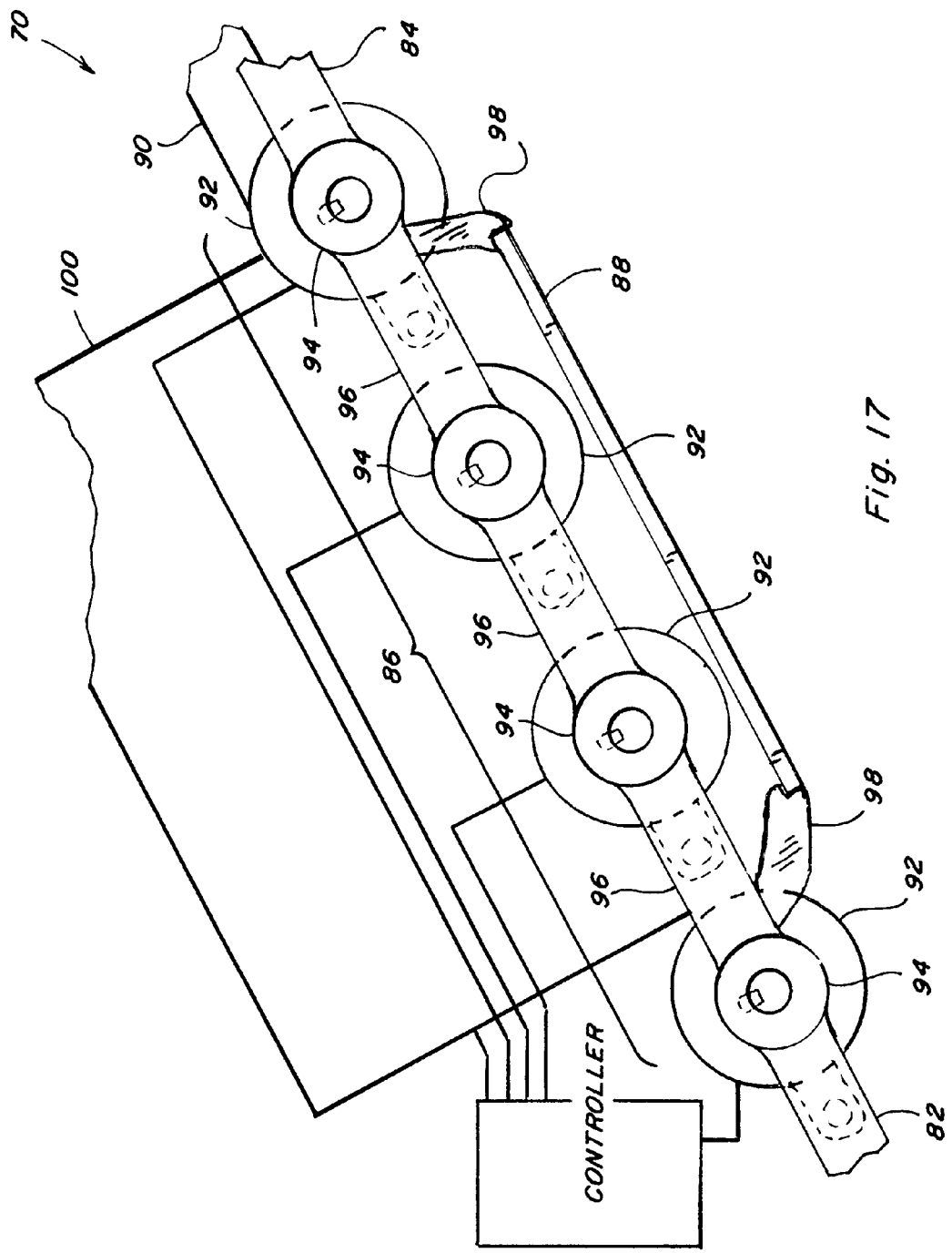
FIG. 17 is a fragmentary end view of the apparatus of the system for gathering, cinching and cutting the wrapper, showing a clamp thereof in an initial flat configuration, and elements of apparatus for dispensing the clamp.
Figure 18:
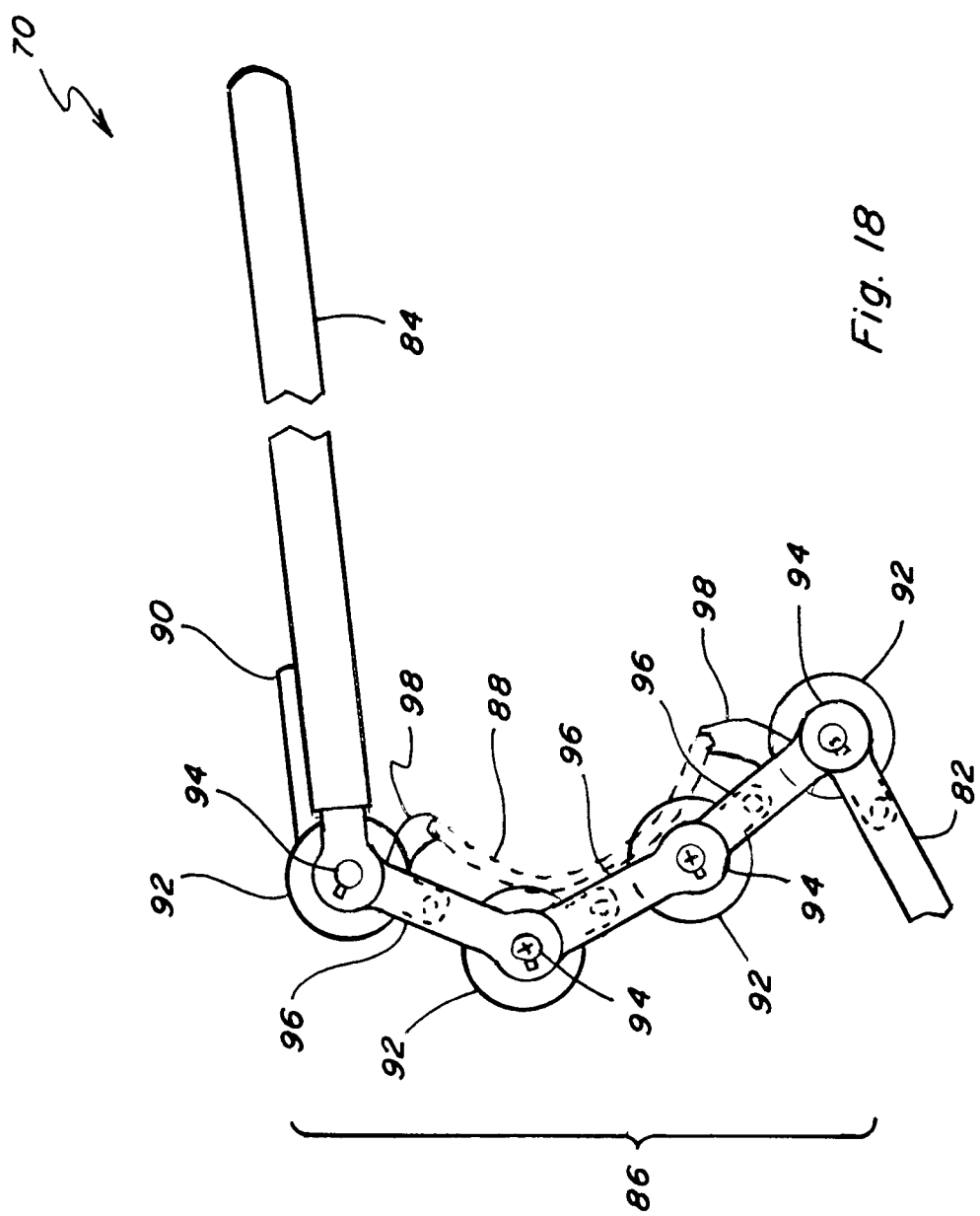
FIG. 18 is a fragmentary end view of the apparatus of the system for gathering, cinching and cutting the wrapper, in an operating configuration and showing a clamp thereof in a partially clamped configuration.
Figure 19:
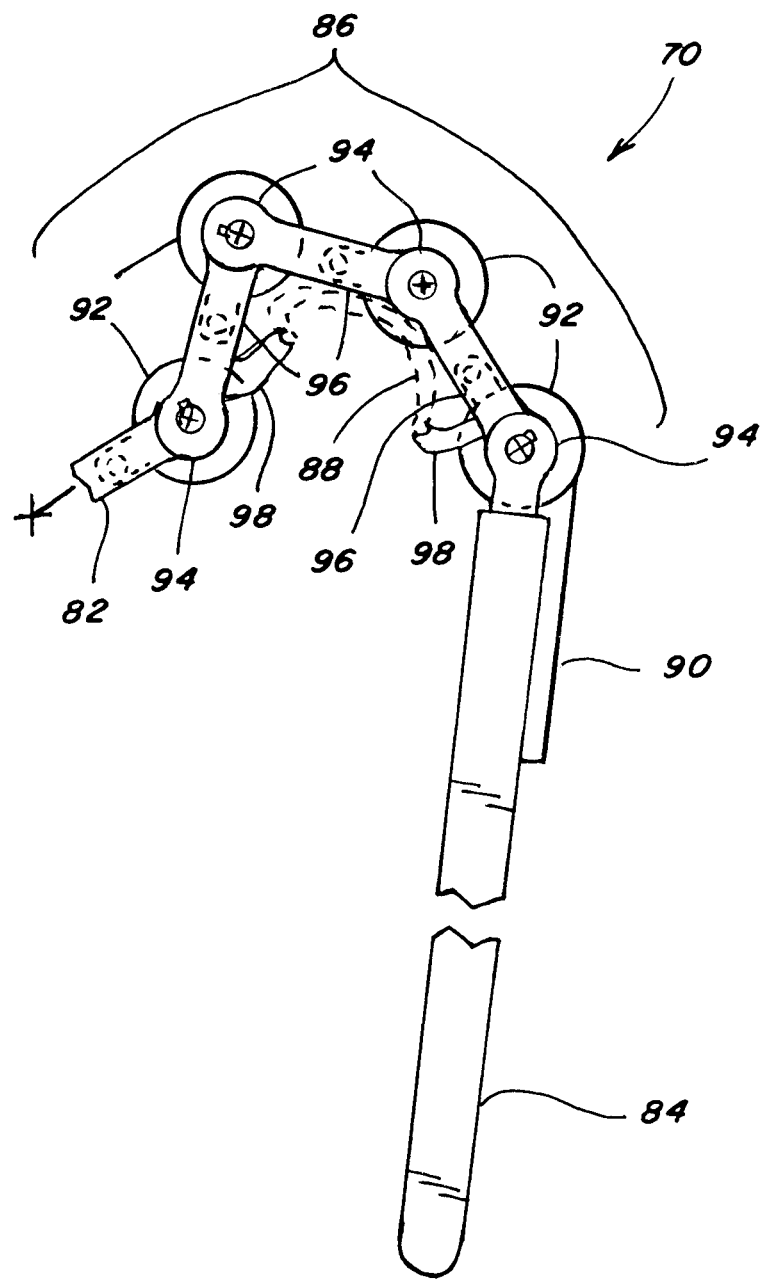
FIG. 19 is another fragmentary end view of the apparatus of the system for gathering, cinching and cutting the wrapper, in another operating configuration and showing a clamp thereof in a greater partially clamped configuration.

FIGS. 17, 18 and 19 illustrate construction of one preferred embodiment of jaw 86 of apparatus 70 and its operation. Essentially, jaw 86 is connected at one end to a distal end of support arm 82, and at the opposite end to gathering arm 84. Jaw 86 includes several powered actuators 92, in connection with knuckle joints 94, respectively, joining together a plurality of jaw segments 96. Actuators 92 can be hydraulically or electrically operable for articulating a corresponding number of knuckle joints 94 connecting jaw segments 96, under control of a suitable controller such as a microprocessor based controller that can be located on harvester 24 or at another suitable location and connected to actuators 92 via suitable conductive paths such as wires of a wiring harness, a local network, or the like. Operation can be incorporated with the bale unloading operation, such that apparatus 70 is deployed and the two wrappers are clamped and cut apart when the unloaded bale is properly positioned in relation to apparatus 70. Power can be provided to actuators 92, and also to the cylinder or other actuator for moving apparatus 70 to the operating position shown, by the electrical or hydraulic system of harvester 24.

It can be observed by comparing the referenced FIGURES that actuators 92 are preferably independently actuated, to effect the desired gathering and closing motions. This is achieved in the above-described manner of operation, by the initial actuation of actuator 92 closest to gathering arm 84 for making its initial motions indicated variously by arrows G, followed by actuation of the other actuators for making the subsequent motions of arm 84 and closing of jaw 86 about clamp 88 and the gathered material, as denoted variously by the arrows C. The endmost actuator can also be activated in a manner for operation of knife 90 when the clamping action is complete or nearly complete, for severing the clamp to separate it into the two sections along with the wrapping material.

Figure 20:
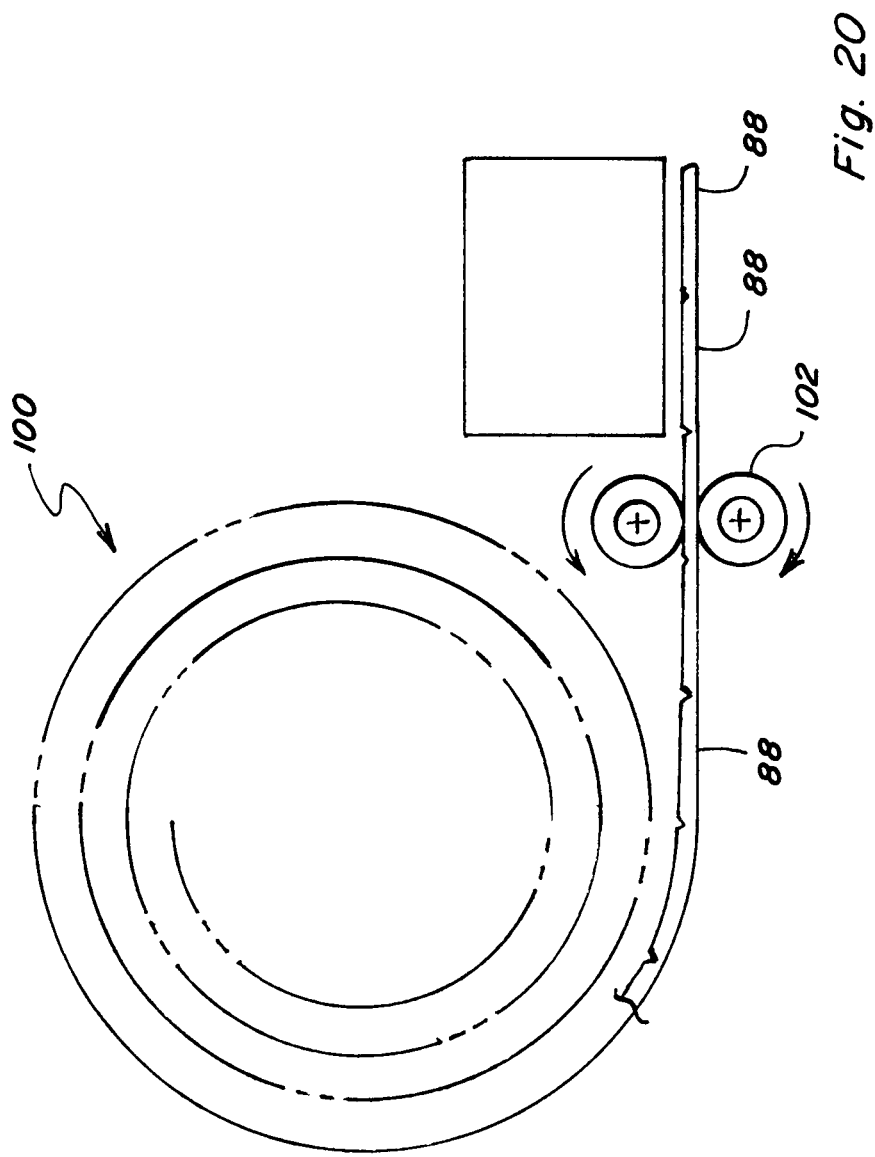
FIG. 20 is a simplified schematic view of the apparatus for dispensing clamps.
Figure 21:
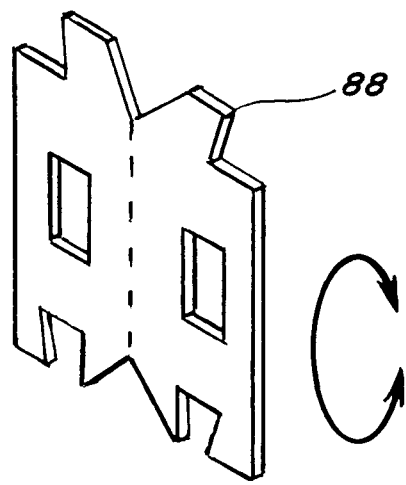
FIG. 21 is a perspective view of a representative clamp of the system of the invention.
Figure 22:
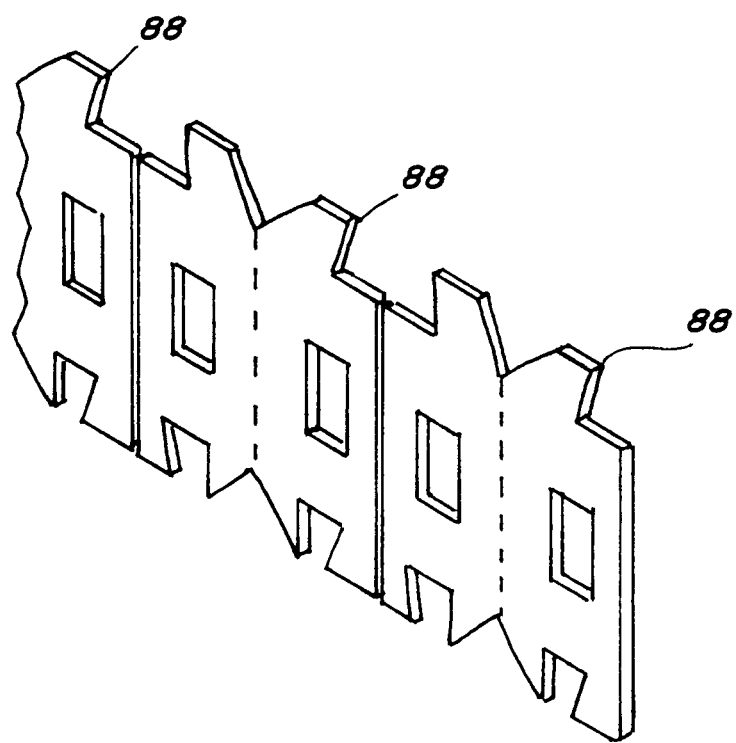
FIG. 22 is a perspective view of a strip of several of the clamps of FIG. 21.

Referring also to FIGS. 20, 21 and 22, apparatus 70 includes clamp jaws 98 in connection with appropriate elements of jaw 86 at spaced locations for cooperatively receiving and holding a clamp 88 for clamping around the cinched material as the jaw is closed. Apparatus 70 additionally includes an automatic clamp dispenser 100 that can be carried adjacent to the distal end of support arm 82, and operable in conjunction with clamp jaws 98 for dispensing clamps 88 thereto when jaw 86 is in its fully open configuration. As an alternative, dispenser 100 can be located on the side of the wrap dispensing structure for dispensing a clamp when apparatus 70 is in its standby position. In either instance, when a clamp is received, jaw 86 can initiate a slight closing movement for retaining and positioning the clamp for use. Dispenser 100 is configured and operable for carrying a quantity of clamps 88 in a roll, and includes a feed roller or gear mechanism 102 for incrementally feeding clamps 88 individually to clamp jaws 98. When a clamp 88 is retained in jaws 98, the closing action of jaw 86 will act to tear the clamped clamp from dispenser 100, and the adjacent clamps 88 can be scored or precut at appropriate locations for this as illustrated. Each clamp 88 will be clamped into essentially a circular configuration, and is configured to have a sufficient length and interlocking opposite ends to facilitate this. In FIG. 21, a circular arrow accompanies the single clamp shown to illustrate the direction of clamping. It can also be observed that each of the clamps has a rectangular hole therethrough, located for interaction with cleats or teeth of mechanism 102 for feeding the clamps.

In light of all the foregoing, it should thus be apparent to those skilled in the art that there has been shown and described a system and method for wrapping large bales. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A mobile bale forming apparatus having a floor for carrying compacted bales from a bale forming chamber of the apparatus,
   an improvement characterized by a system for individually wrapping the bales including a wrap dispensing structure disposed about a path along the floor and defining an opening through which the bales will successively pass when leaving the bale forming chamber, the wrap dispensing structure holding and containing an elongate tube of wrapping material having cross sectional dimensions for fitting about the bales and a longitudinal dimension sufficient for receiving at least two of the bales in succession, the wrap dispensing structure being configured and operable for holding an open end of the tube of the wrapping material about the opening such that as each of the bales pass through the opening the bales will enter the tube and progressively pull the wrapping material from the wrap dispensing structure about the bale so as to be progressively covered by the wrapping material and so as to be at least substantially fully covered by the wrapping material when exiting the opening; the system for wrapping the bales further including a wrapper closing apparatus disposed adjacent to the wrap dispensing structure, configured and operable for gathering the tube of the wrapping material between the wrap dispensing structure and the wrapped bale, cinching the material about an end of the bale to close the tube, and placing a clamp about the cinched material for holding the tube closed about the end of the bale, the wrapper closing apparatus including:
   a support arm having a terminal end; and
   a gathering arm having a first end interconnected to the terminal end of the support arm by a jaw and a free second end, the jaw configured to rotate the gathering arm about the terminal end of the support arm between a first position for receiving the uncinched wrapping material adjacent thereto and a second position wherein the wrapping material is cinched within the jaw.

2. A mobile bale forming apparatus of claim 1, wherein the jaw is configured to simultaneously tighten the clamp about the cinched wrapping material as the gathering arm is rotated from the first to the second position.

3. A mobile bale forming apparatus of claim 2, wherein as the gathering arm moves from the first position to the second position, the jaw carries the gathering arm along a generally circular path about the tube of the wrapping material about a center region of the end of the bale, for gradually gathering the wrapping material toward the center region of the end of the bale.

4. A mobile bale forming apparatus of claim 1, wherein the wrapper closing apparatus is configured and operable to be automatically movable between said first position adjacent to a path of movement of the bales from the opening of the wrap dispensing structure to allow unobstructed passage of the bales from the opening, and said second position in the path of movement of the bales.

5. A mobile bale forming apparatus of claim 1, wherein the terminal end of the support arm of the wrapper closing apparatus carries a dispenser including a plurality of the clamps, the dispenser being configured and operable for dispensing the clamps in succession into the jaw.

6. A mobile bale forming apparatus of claim 5, wherein the wrapper closing apparatus is configured and operable for severing the clamp and the clamped wrapping material for enclosing an end of the tube of the wrapping material for a next successive one of the bales.

7. A mobile bale forming apparatus of claim 1, wherein the tube of the wrapping material includes spaced apart open mesh regions disposed so as to cover the ends of the bales when wrapped with the material.

8. A mobile bale forming apparatus having a floor for carrying compacted bales from a bale forming chamber of the apparatus,
   an improvement characterized by a method for individually wrapping the bales including steps of:
   providing a wrap dispensing structure disposed about a path along the floor and defining an opening through which the bales will successively pass when leaving the bale forming chamber, the wrap dispensing structure holding and containing an elongate tube of wrapping material having cross sectional dimensions for fitting about the bales and a longitudinal dimension sufficient for receiving at least two of the bales in succession;
   utilizing the wrap dispensing structure for holding an open end of the tube of the wrapping material about the opening such that as each of the bales pass through the opening the bales will enter the tube and progressively pull the wrapping material from the wrap dispensing structure about the bale so as to be progressively covered by the wrapping material and so as to be at least substantially fully covered by the wrapping material when exiting the opening;
   providing a wrapper closing apparatus adjacent to the wrap dispensing structure, the wrapper closing apparatus including:
   a support arm having a terminal end; and
   a gathering arm having a first end interconnected the terminal end support arm by a jaw and a free second end, the jaw configured to rotate the gathering arm about the terminal end of the support arm between a first position for receiving the uncinched wrapping material adjacent thereto and a second position wherein the wrapping material is cinched within the jaw; and
   utilizing the wrapper closing apparatus to gather the tube of the wrapping material between the wrap dispensing structure and the wrapped bale, cinch the material about an end of the bale to close the tube, and clamp a clamp about the cinched material holding the tube closed about the end of the bale.

9. The method of claim 1, wherein the jaw moves the gathering arm in a generally circular manner for cinching the wrapping material about the end of the bale while simultaneously tightly clamping the clamp about the cinched wrapping material.

10. The method of claim 9, wherein the jaw carries the gathering arm along a generally circular path about the tube of the wrapping material about a center region of the end of the bale to gradually gather the wrapping material toward the center region of the end of the bale.

11. The method of claim 8, wherein the wrapper closing apparatus automatically moves between said first position adjacent to a path of movement of the bales from the opening of the wrap dispensing structure to allow unobstructed passage of the bales from the opening, and said second position in the path of movement for performing the steps of gathering the tube of the wrapping material between the wrap dispensing structure and the wrapped bale, cinching the material about an end of the bale to close the tube, and clamping a clamp about the cinched material holding the tube closed about the end of the bale.

12. The method of claim 11, wherein the terminal end of the support arm of the wrapper closing apparatus carries a dispenser including a plurality of the clamps, the dispenser being configured and operable for dispensing the clamps in succession into the jaw.

13. The method of claim 12, wherein the wrapper closing apparatus is configured and operable for severing the clamp and the clamped wrapping material for enclosing an end of a wrapper of the tube of the wrapping material for a next successive one of the bales.

\* \* \* \* \*